Aug. 1, 1961  C. M. CARLSON ET AL  2,994,560
BICYCLE WHEEL
Filed July 7, 1958  2 Sheets-Sheet 1
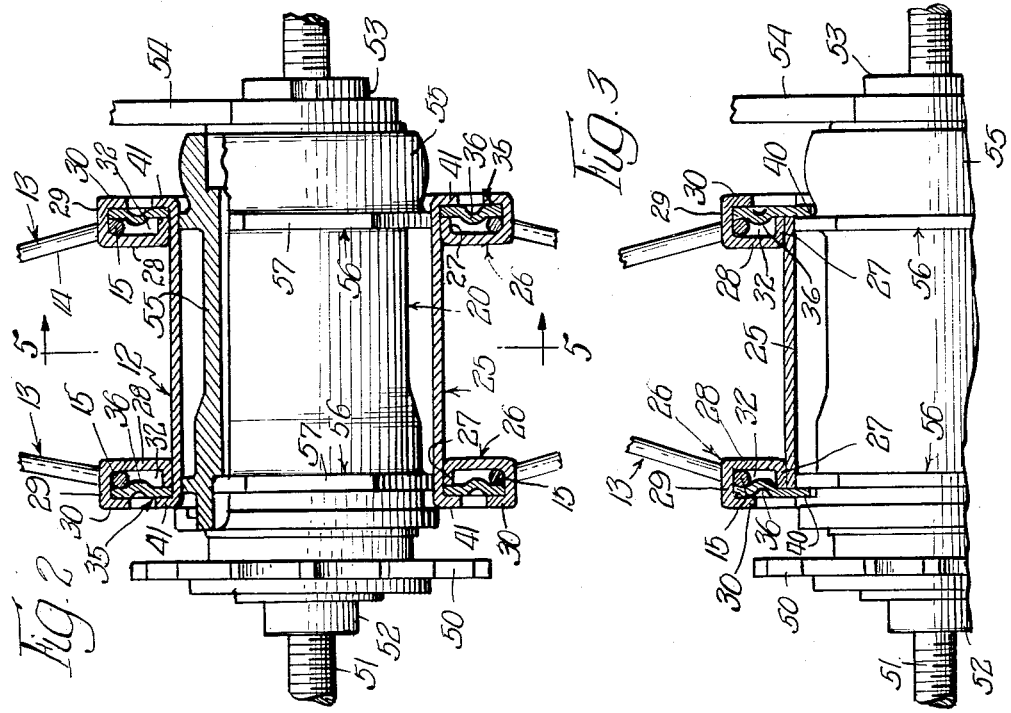
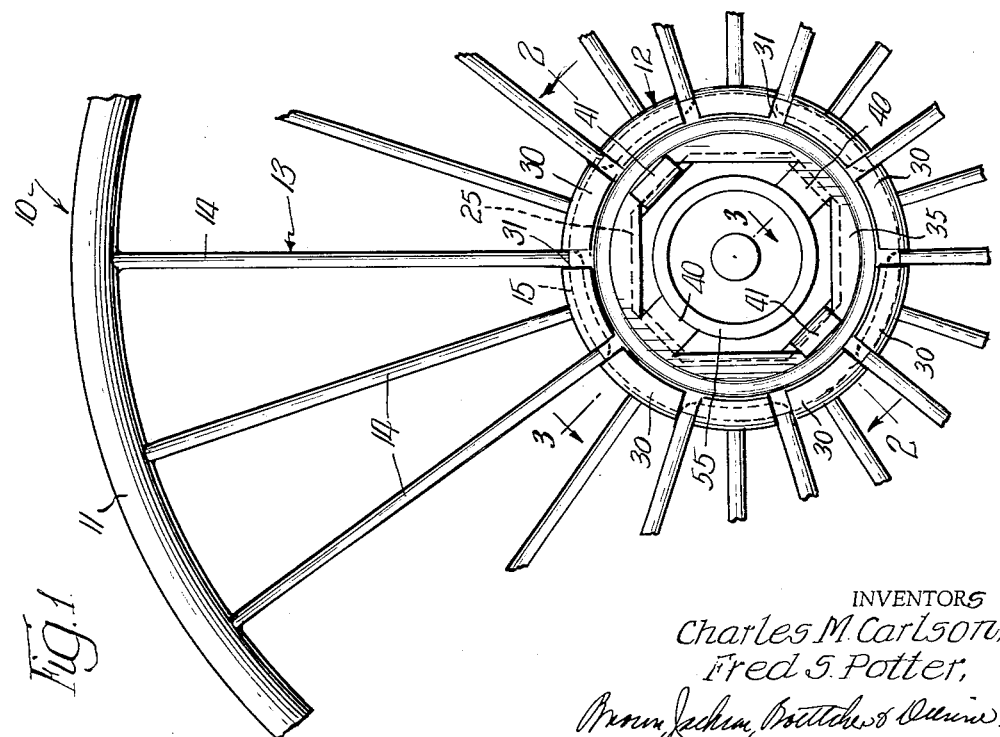
INVENTORS
Charles M. Carlson,
Fred S. Potter, Aug. 1, 1961  C. M. CARLSON ET AL  2,994,560
BICYCLE WHEEL
Filed July 7, 1958  2 Sheets-Sheet 2
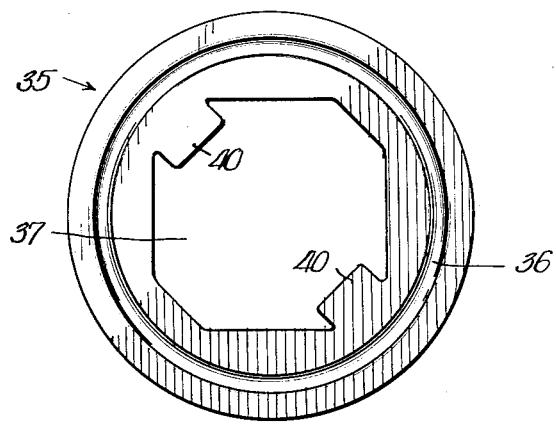
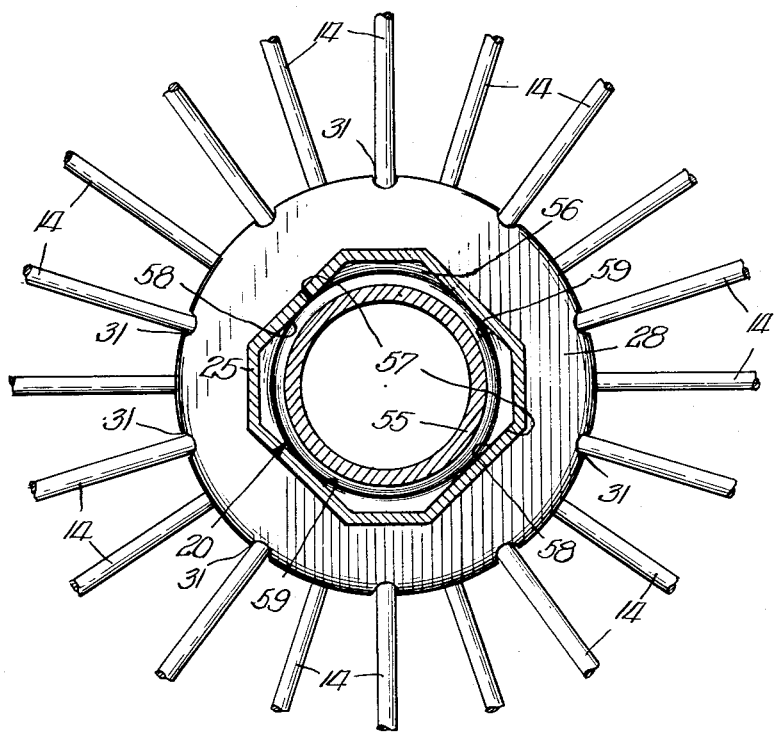
INVENTOR.
Charles M. Carlson,
BY Fred S. Potter, United States Patent Office 2,994,560
Patented Aug. 1, 1961

2,994,560
BICYCLE WHEEL
Charles M. Carlson and Fred S. Potter, Warsaw, Ind., assignors to Sun Metal Products, Inc., Warsaw, Ind., a corporation of Indiana
Filed July 7, 1958, Ser. No. 746,792
4 Claims. (Cl. 301—59)

This invention relates to wheels and more particularly to improvements in fabricated wheels with coaster brakes for bicycles.

While this invention relates generally to wheels, it is more germane to spoked bicycle wheels, especially the rear drive wheels which embody coaster brake means operable according to familiar principles. The invention is related especially to wheels in which the spokes are aligned in a non-tangent relationship with respect to the central hub thereof, as opposed to the tangent alignment employed in the so-called tangent spoke wheel. Briefly, this invention relates to an improved wheel frabricated largely of sheet metal stock in which a central hub having spokes radiating therefrom to a concentrically outlying rim, receives and lockingly engages a pre-assembled coaster brake unit. The brake unit includes a housing provided with a polygonal exterior portion for locking engagement with corresponding surfaces formed in the wheel hub and is thereby prevented from rotating relative to the latter. Additional means are also provided for locking the brake unit against axial displacement from the wheel hub, as well.

A wheel structure of this nature readily lends itself to fabrication from sheet metal materials and effects remarkable economies in the production of the coaster brake wheels, since the threading of the spokes through openings in the wheel hub and the assembly of the coaster brake elements, piece by piece, are eliminated according to our teaching.

The main object of our invention is to provide a new and improved wheel for bicycles.

A further object of our invention is to provide a new and improved fabricated wheel, as aforesaid, which includes an improved hub structure capable of receiving a pre-assembled coaster brake unit to effect economies in the production of bicycles.

A still further object of our invention is to provide a new and improved fabricated wheel structure embodying a pre-assembled coaster brake, mountable in the hub of the wheel as a unit and adapted to be held against axial and rotary displacement by suitable locking means on the wheel hub.

The above and further objects, features, and advantages of our invention will appear to those familiar with the art from the following detailed description of a preferred embodiment illustrated in the accompanying drawings.

In the drawings:

FIGURE 1 is a front elevation view illustrating the structural features of our improved including an axially located brake unit, with portions of the wheel being broken away;

FIGURE 2 is a cross-sectional view, slightly enlarged, taken substantially at line 2—2 of FIGURE 1, showing the hub structure of our wheel in section, and the brake unit partly in section and partly in elevation, the brake unit being shown with a conventional drive sprocket and brake arm;

FIGURE 3 is a partial sectional view, slightly enlarged, taken substantially at line 3—3 of FIGURE 1, showing further details of the hub structure and particularly the means for engaging and locking the brake assembly in position, the brake assembly being shown with a conventional drive sprocket and brake arm;

FIGURE 4 is a detail view of a plate member forming part of the hub structure of the wheel of the invention; and FIGURE 5 is a cross-sectional view taken substantially on the line 5—5 of FIGURE 2, looking in the direction of the arrows, the interior mechanism of the brake unit being omitted.

Considering FIGURE 1 of the drawings, we have therein illustrated a wheel 10 which embodies the features and concepts of our invention. Briefly, wheel 10 includes an annular rim 11 which is held concentrically outward and radially spaced from a central hub assembly 12 by means of plural U-shaped spoke bails 13, each of which comprises a pair of divergently related spokes 14, 14 interjoined at their radially innermost ends by a short connecting portion 15 held to the hub assembly 12.

In addition to holding the radially innermost ends of the spoke bails 13, the hub assembly 12 houses a pre-assembled coaster brake unit, indicated generally by numeral 20 (FIGURE 2), which is constructed according to familiar principles and features.

The rim 11 comprises an annular member of conventional transverse curvilinear configuration made of cold rolled steel, or the like, having opposed end portions joined by a butt-weld (not shown). The outer ends of spokes 14 pass through suitable openings formed substantially on the central plane of the rim member, and are connected thereto by welding, peening, swaging, or a like fastening operation, according to known and recognized practice.

The hub assembly 12, as best seen from the sectional views of FIGURES 2, 3 and 5, includes a generally tubular hub body 25 disposed with its longitudinal axis coaxial with the central axis of the wheel rim and preferably having a generally polygonal cross-sectional configuration, as shown in FIGURES 1 and 5 of the drawings. The hub body 25 is surrounded adjacent its opposite ends with generally annular spoke retainer rings 26, 26, each of which has a generally C-shaped cross section, as shown in FIGURES 2 and 3. The spoke retainer rings are formed with a polygonal interior profile conforming to the exterior configuration of the hub body 25 (FIGURE 5) the latter engaging an inner lip wall 27 of the rings 26. Each ring 26 also includes a back wall 28, at right angles to its inner lip wall 27, an outer wall 29 paralleling inner lip wall 27 and a front wall comprising plural spaced lug sections 30, the walls 28, 29 and 30 of each ring 26 defining a radially-inwardly facing groove. The outer wall 29, which comprises the bottom of said groove, is periodically interrupted by slotted openings 31 (see FIGURE 1) for the passage of the spokes 14, so that the connecting portion 15 of each associated pair of spokes may be placed beneath a section of wall 29, intermediate two of the openings 31. The front wall sections 30, also separated by the openings 31, are turned over the several connecting portions 15 to hold the same in the C-shaped channel or chamber 32 interiorly of the retainer rings 26. When so turned over, the wall sections 30 bear against the outer face of a substantially annular face plate or disc element 35, one of which is disposed at each end of the hub body portion 25. Each face plate 35 is provided with a substantially polygonal central opening 37 which substantially coincides over most of its perimeter with the inner edge of the polygonal opening at one end of the tubular hub body 25. Each plate 35 also includes an annular bead 36 adjacent its radially outermost edge for locating and abuttingly supporting the spoke connecting portions 15, thereby preventing inward radial movement of the spoke bails 13. One of the face plates 35 abuts each end of the tubular hub body 25, and each plate 35 carries a pair of diagonally opposed lugs 40, 40 (FIGURES 1, 3 and 4) which extend inwardly of the periphery of a central polygonal opening 37 therein to lock the brake unit 20 within the tubular hub body 25 and prevent thereby axial displacement of the brake unit. The tubular hub body 25 is provided at each of its ends, and at diagonally opposed sides, with a pair of lugs 41, 41 and, when the hub components are assmbled as shown in FIGURE 1, the lugs 41, 41 are displaced 90° from the lugs 40, 40. Initially, the lugs 41, 41 are formed as longitudinal extensions of the corresponding sides of the tubular hub body 25, and project through the opening 37 in the plate 35. The lugs 41 are then struck radially outwardly and brought to bear against the outer face of the respective plates 35 to hold the latter securely against the axially outermost end of the inner lip wall portion 27 of the spoke retainer rings 26, 26. This latter relationship will best be understood by examining FIGURE 2 of the drawings.

With respect to the assembly and fabrication of the hub 12, as just described, it will be recognized that the pairs of lugs 40, 40, associated with the two face plates 35, as well as the lugs 41, 41, are disposed in opposing registration at opposite ends of the wheel hub 12. Additionally, in securing the several spoke bails 13 to the retainer ring elements 26, 26, the downwardly struck outer or front wall portions 30 serve to interfere with axial removal of the spoke connecting portions 15 and to press the face plates 35 tightly thereagainst, thereby fixing such portions 15 between the outer wall 29 and bead 36. Lugs 41, 41 also cooperate with the wall sections 30 in holding the face plates 35 in position within ring elements 26 and overlapping the ends of the tubular hub body 25.

The lugs 40, associated with the two face plates 35, serve to retain the subassembled brake unit 20 within the tubular hub body 25 by extending to an interfering position inwardly of the periphery of the substantially polygonal central opening of such face plates 35 and the registering wall of the tubular hub body 25.

The brake unit 20 includes a familiar drive sprocket 50 mounted on one end of the threaded axle 51, bearing cones 52, 53, brake arm 54 at the other end of axle 51, and a substantially tubular housing 55 in which the working elements and discs (not shown) of the coaster brake are retained in a familar and known manner. In the embodiment shown, the housing 55 is provided with a pair of parallel outwardly extending radial flange portions 56, 56, the flange portions being formed with a polygonal exterior profile corresponding with the interior of the tubular hub body 25 and having diametrically opposed flat surfaces 57, 57 which are adapted to interlockingly mate and engage with correspondingly disposed planar walls 58, 58 and 59, 59 of the hub body 25 (see FIGURES 1 and 5). With this arrangement, the housing 55 of the brake assembly is effectively prevented from rotating with respect to the hub assembly 12, as is required for the successful operation of the coaster brake. While, preferably, we employ polygonal exterior flanges on the brake housing 55 for interlocking engagement with the corresponding interior faces of the tubular hub body 25, as described, the brake housing and hub body also may be interlocked in other known fashions as by a key and keyway therebetween, holding bolts, weldings, or other conventional and recognized fastening expedients. As a further alternative, the brake housing 55 may itself be formed with a polygonal exterior cross-sectional configuration adapted to engage with the corresponding interior faces of the tubular hub body 25, whereby relative rotation between the brake housing and the hub body may be prevented.

When the brake unit is initially inserted within the tubular hub body 25, the lugs or ears 40, 40 on the plate 35 at one end of the wheel hub are radially disposed and thus interferingly aligned to prevent axial passage of the brake unit beyond the one end of the wheel hub. Thereafter, the lugs 40, 40 on the plate 35 at the opposite end of the wheel hub are turned radially inwardly, as viewed in FIGURE 1, for instance, to securely lock the brake unit within the hub body 25 by engaging the flange members 56, 56 between the respective pairs of lugs 40, 40, as best illustrated in FIGURE 3. To accomplish assembly, of course, it is necessary to remove either the brake arm 54 or the sprocket wheel 50 in order to insert the brake unit into the interior of the tubular hub body, but other than that, the entire brake assembly is adapted to be mounted as a unit in the hub of the wheel in the manner described.

From the foregoing description, it is believed that those familiar with the art will readily recognize and appreciate the improvements which mark the present wheel structure as an inventive advancement and will understand that while we have herein shown and described our invention as it occurs in a preferred embodiment illustrated in the accompanying drawings, nevertheless the same is subject to modifications, alterations, and substitutions of equivalents without necessarily departing from its spirit and scope. Consequently, it is not our intention that we be limited to the particulars of the device hereinabove described and shown except as may appear in the following appended claims.

We claim:

1. In a bicycle wheel, a central wheel hub assembly adapted to receive a coaster brake assembly, said hub assembly having a generally tubular body portion, a disc element disposed in abutting relation over each end of said body portion and having a central opening communicating substantially registeringly with the interior of said body portion, one of said disc elements having at least one lug extending radially inwardly into its said central opening and adapted to abut against a brake assembly adjacent one end of the latter when the brake assembly is inserted into said body portion, the other of said disc elements having at least one lug extending axially outwardly therefrom and adapted to be struck radially inwardly into its said central opening for abutting contact with such brake assembly adjacent its other end, a spoke retainer ring surrounding said body portion adjacent each end thereof and having a radially-inwardly facing groove containing the adjacent one of said disc elements, a plurality of spokes projecting into said grooves through the bottoms thereof, the inner ends of said spokes being retained between said respective disc elements and a wall of the respective grooves, said body portion having lug means at each end thereof extending respectively through said central openings in said disc elements and struck radially outwardly into contact with the outer faces of the respective disc elements to hold the latter firmly against the respective outer ends of said body portion.

2. A bicycle wheel in accordance with claim 1, wherein each of said spoke retainer rings is provided with a plurality of radial slots distributed circumferentially in one wall and in the bottom of said groove, and said spokes project through the slots in the bottom of said groove, said spokes being joined in pairs by connecting the inner ends of adjacent spokes within said groove, the disc elements associated with said spoke retaining rings being confined respectively in said grooves by the slotted walls thereof, the joined ends of said spokes being held by said disc elements against the respective other walls of said grooves.

3. A bicycle wheel in accordance with claim 2, wherein each of said disc elements includes an annular ridge contacting the said joined ends of said spokes.

4. In a bicycle wheel, a central hub assembly including a generally tubular-shaped body portion having a substantially polygonal internal cross-section, a coaster brake unit including a generally tubular housing mounted concentrically within said body portion and having an exterior surface of polygonal cross-section corresponding to the interior surface of said body portion and matingly engaging the latter to prevent relative rotation between said housing and said body portion, a disc element disposed in abutting relation over each end of said body portion and having a central opening conforming substantially registeringly with the internal cross-section of said body portion, said disc elements having lug members projecting radially inwardly into their respective central openings and abutting against said brake housing adjacent the opposite ends thereof to prevent axial displacement of said brake unit relative to said body portion, a spoke retainer ring surrounding said body portion adjacent each end thereof and having a radially-inwardly facing groove containing the adjacent one of said disc elements, each of said spoke retainer rings being provided with a plurality of radial slots distributed circumferentially in one wall and in the bottom of said groove, a plurality of spokes projecting into said grooves through said slots in the bottoms thereof, said spokes being joined in pairs by connecting the inner ends of adjacent spokes within said grooves, said body portion including lug means at each end thereof extending respectively through said central openings in said disc elements and struck radially outwardly into contact with the outer faces of the respective disc elements to hold the latter firmly against the respective outer ends of said body portion, the disc element associated with each of said spoke retainer rings being confined in the groove thereof by the slotted wall of said groove, said joined ends of said spokes being held by said disc elements against the respective other walls of said grooves.

References Cited in the file of this patent

UNITED STATES PATENTS

| | | |
|---|---|---|
| 852,668 | Marsal et al. | May 7, 1907 |
| 870,565 | Latty | Nov. 12, 1907 |
| 2,357,188 | English | Aug. 29, 1944 |

FOREIGN PATENTS

| | | |
|---|---|---|
| 111,507 | Austria | Dec. 10, 1928 |